United States Patent [19]
Thomas

[11] Patent Number: 5,160,400
[45] Date of Patent: Nov. 3, 1992

[54] CORRUGATING APPARATUS HAVING A LIQUID FILLED SEAL ROLL

[75] Inventor: Charles E. Thomas, Baltimore, Md.

[73] Assignee: United Container Machinery Group, Inc., Glen Arm, Md.

[21] Appl. No.: 528,298

[22] Filed: May 24, 1990

[51] Int. Cl.⁵ .......................... B31F 1/28; B32B 31/12
[52] U.S. Cl. ................... 156/382; 29/129.5; 156/472; 156/473
[58] Field of Search .......... 156/473, 472, 471, 470, 156/382; 29/110, 129.5, 123; 100/155 R; 165/89

[56] References Cited

U.S. PATENT DOCUMENTS

| | | | |
|---|---|---|---|
| 1,702,140 | 2/1929 | Topham | 29/110 |
| 3,844,822 | 10/1974 | Boss et al. | 118/70 X |
| 4,229,644 | 10/1980 | Namiki et al. | 29/129.5 X |
| 4,261,784 | 4/1981 | Saito | 156/389 |
| 4,471,515 | 9/1984 | Takenaka et al. | 29/110 |
| 5,030,504 | 7/1991 | Botsolas et al. | 427/365 X |
| 5,110,396 | 5/1992 | Harris | 156/382 |

Primary Examiner—Michael W. Ball
Assistant Examiner—Michele K. Yoder
Attorney, Agent, or Firm—Biebel & French

[57] ABSTRACT

An improved idler roll is disclosed including a longitudinal cylinder having tubular walls sealed at the ends by flanged stub shafts. The interior of the idler roll is filled with ethylene glycol. The idler roll can be placed into rolling abutment with a heated surface, and when the idler roll is stopped for a period of time, the thermal distortion along the longitudinal length of the idler roll is minimal. When the idler roll is once again started, the fluid in the idler roll causes a forced convection heat transfer, evenly distributing the temperature of the idler roll, and thereby eliminating the thermal distortion.

3 Claims, 6 Drawing Sheets

CORRUGATING APPARATUS HAVING A LIQUID FILLED SEAL ROLL

BACKGROUND OF THE INVENTION

1. Field of the Invention

The subject invention relates to an improved idler roll for use with either a single or double facer corrugating apparatus and, in particular, to a fluid filled idler roll for use in tangential abutment with driven heated surfaces.

2. Description of the Prior Art

In process machinery it is common to place idler rolls against driven rolls in order to direct the flow of the medium being processed. It is also common, that these idler rolls are in abutment with heated rolls, or similarly, idly roll against a heated surface. These idler rolls are generally comprised of a solid steel material, pivotally fixed at their ends adjacent to the cooperating heated surface.

A problem presently plaguing the process machinery industry is thermal distortion of these rolls along their longitudinal length, causing a bowed configuration of the idler roll. This distortion is more prevalent upon restarting of the equipment after a shutdown, where the idler rolls were in edgewise engagement with a heated surface over an extended period of time.

For example, in some equipment, these idler rolls are precision crafted, where rolls exceeding six feet in length must be held within tolerances of 0.001 inches in runout. However, it is not uncommon that, after an extended shutdown, the distortion along the longitudinal length can approach 0.060 inches in runout.

To exaggerate the problem further, upon startup of the machinery, the idler rolls remain distorted for long periods of time, possibly up to 30 minutes or longer; and during such time, the idler rolls are in distorted engagement against the heated surfaces causing uneven wear of both the idler roll and the mating surface. Furthermore, if the paper web is fed between the idler roll and the heated surface, it could be unevenly pressurized, or worse yet, it could be crushed by the bowed idler roll.

By way of example, a single facer apparatus for producing single faced corrugated board produces corrugated flutes from a flat web of paper medium by feeding the flat web through the nip point of two meshing corrugating rolls, typically an upper and lower roll. To adhere the corrugated medium to a first liner paper, the single facer includes a heated pressure roll in tangential abutment with the lower corrugating roll, and the flute tips of the medium web are coated with adhesive and merged together with the liner web, between the lower corrugating roll and the pressure roll. During the transfer of the corrugated medium from the nip point between the two corrugating rolls, to the nip point between the lower corrugating roll and the pressure roll, it is important that the flutes of the medium remain within the corresponding corrugations of the corrugating roll.

To this end, it is common to form a pressurized chamber around at least the lower corrugating roll, such that the formed medium is forced against the lower corrugating roll to retain the formed flutes within the corrugations of the lower corrugating roll. A seal roll is placed in tangential abutment with the heated pressure roll, to seal the pressure chamber effectively along the longitudinal length of the pressure roll.

In the manufacturing of corrugated paper, it is common to have extended periods of time, where the single facing apparatus is idle. This could be due to a paper jam, or could simply be a changing of the paper size to vary the thickness and rigidity of the corrugated board. During such time, the heated corrugating rolls and the heated pressure roll, remain heated, as the heat up time for these rolls is quite lengthy due to their size.

When the single facer corrugating apparatus is stopped, a longitudinal edge of the seal roll is pressed against the heated pressure roll, with the liner paper therebetween. This contact causes heating of the roll along the longitudinal edge resulting in thermal distortion of the seal roll along the longitudinal length. The thermal distortion causes the seal roll to take on a bowed configuration, having an eccentric central portion facing the heated pressure roll.

When the machine is once again started, this bowed configuration causes engagement of the eccentric portion with the pressure roll which results in uneven sealing of the pressurized air along both the seal roll and the pressure roll. The engagement of the eccentric portion against the pressure roll can also tear or weaken the liner paper at the eccentric portion, which continues until the seal roll is uniformly heated. A tearing of the liner paper results in unnecessary downtime and a waste of paper.

In another example, a double facer apparatus produces double faced corrugated board by feeding the single faced corrugated board to the apparatus and merging it with a second liner paper, with adhesive therebetween. In order to cure the adhesive, an array of steam heaters are aligned in side-by-side registration, and the single faced corrugated board and second liner paper are pulled over the upper surface of the heaters. To assist in the heat transfer, pressure is applied to the second liner and the single faced board, by placing a continuous belt over the single faced corrugated board with weight rolls positioned above the belt.

A similar thermal distortion phenomenon occurs with the weight rolls on the double facer apparatus, as occurs with the seal roll on the single facer. When the double facer apparatus is shut down for any length of time, a longitudinal edge of the weight rolls is in contact with the continuous belt. Due to the proximity of the belt to the heaters, the belt is also heated, and the contact between the weight rolls and the belt causes thermal distortion of the weight rolls along their length.

Once again, on start-up, the rolls are distorted, thereby causing the rolls to pressurize the continuous belt unevenly against the corrugated board. Although the purpose of the rolls above the belt is to urge the corrugated board against the heaters to increase the heat transferred to the corrugated board, the bowed rolls result in uneven heating of the double faced corrugated board. When the bowed roll faces away from the belt, the rolls are not pressing the board against the heaters except at the edges. Worse yet, as the bowed rolls rotate one-half turn, the bowed configuration faces the belt, possibly crushing the center portion of the corrugated board beneath the belt. Crushing of corrugated board is detrimental to its utility, as the board is weakened along the lengths of the corrugated flutes, and is more likely to bend along the flutes, or buckle when stacked.

In the above referenced examples, in both the single factor and double facer apparatus, the cause of the distortion in the idler rolls is the extended contact between a longitudinal edge of the solid steel idler roll against the heated surface during the machinery shutdown. This causes an edge of the idler roll to have a higher temperature than that of the remainder of the idler roll. This problem is exaggerated by the inability to equalize the temperature rapidly in the idler roll upon start-up, resulting in a continued distortion of the idler rolls well into the process cycle. As mentioned above, this distortion can continue for a long period of time.

SUMMARY OF THE INVENTION

Experimentation has proven that as the idler roll is solid steel, the heat at the edge can only be transferred by conduction through the solid steel roll. Moreover, as only the edge of the idler roll is in constant contact with the heated surface during shutdown, the edge is continuously heated and will therefore always remain at a higher temperature level than the remainder of the solid steel roll. The temperature differential along the edge causes a longitudinal thermal expansion of the idler roll at the edge, distorting the idler roll to a bowed configuration.

Experimentation has also proven that the time period to equalize the temperature in these rolls upon start-up is quite long, as the thermal distortion has been found to be somewhat self perpetuating. As mentioned above, due to the distortion of the idler roll, the roll is eccentric at the center facing the heated mating surface. As the idler roll rotates, the eccentric portions only of the idler roll are in contact with the heated surface, continuously heating the eccentric portions, thereby perpetuating the distortion.

The remainder of the idler roll is minimally heated by the general radiation from the apparatus itself and from the radiation of the heated surface. As mentioned above, the time for the idler roll to reach an equilibrium temperature may take in excess of one-half hour. During such time, there is a great possibility for damage to the machinery and/or to the corrugated board in process.

It is an object of the invention then to design an idler roll in rolling abutment with a heated surface, where the idler roll only minimally distorts when the apparatus is shut down for an extended length of time.

It is a further object of the invention to design an idler roll which, if thermally distorted, is rapidly equalized in temperature, to alleviate the distortion.

Other objects and advantages of the invention will be apparent from the following description, the accompanying drawings and the appended claims.

The objects of the invention were accomplished by providing an apparatus for manufacturing corrugated board, said apparatus comprising an idler roll; said idler roll having an outer surface which is in tangential rolling abutment against a heated surface; an idler roll comprising a cylindrical tube having an inner sealed chamber formed by relatively thin tubular walls being sealingly covered at their ends, said sealed chamber being at least partially liquid filled, with mounting means adjacent to said ends of said tube for rotatable mounting of said idler roll; said liquid facilitating distributing heat away from a portion of the outer surface.

In this manner, when the machine is stopped, the idler roll does not bow quite so drastically, due to the heat characteristics of the fluid in the roll. As the idler roll is liquid filled, the heated liquid will, due to fluid convection, be relatively uniform in temperature, and will distribute the heat from the heated edge to the other portions of the idler roll. If a temperature differential does exist upon start-up, the liquid in the tube is somewhat churned around inside, as the tube is rotated, thereby equalizing the temperature of the entire idler roll.

BRIEF DESCRIPTION OF THE DRAWINGS

FIG. 4 is a side view of the hollow fluid filled seal roll, partially broken away, for use in the single facer apparatus;

DETAILED DESCRIPTION OF THE PREFERRED EMBODIMENT

Figure 1:
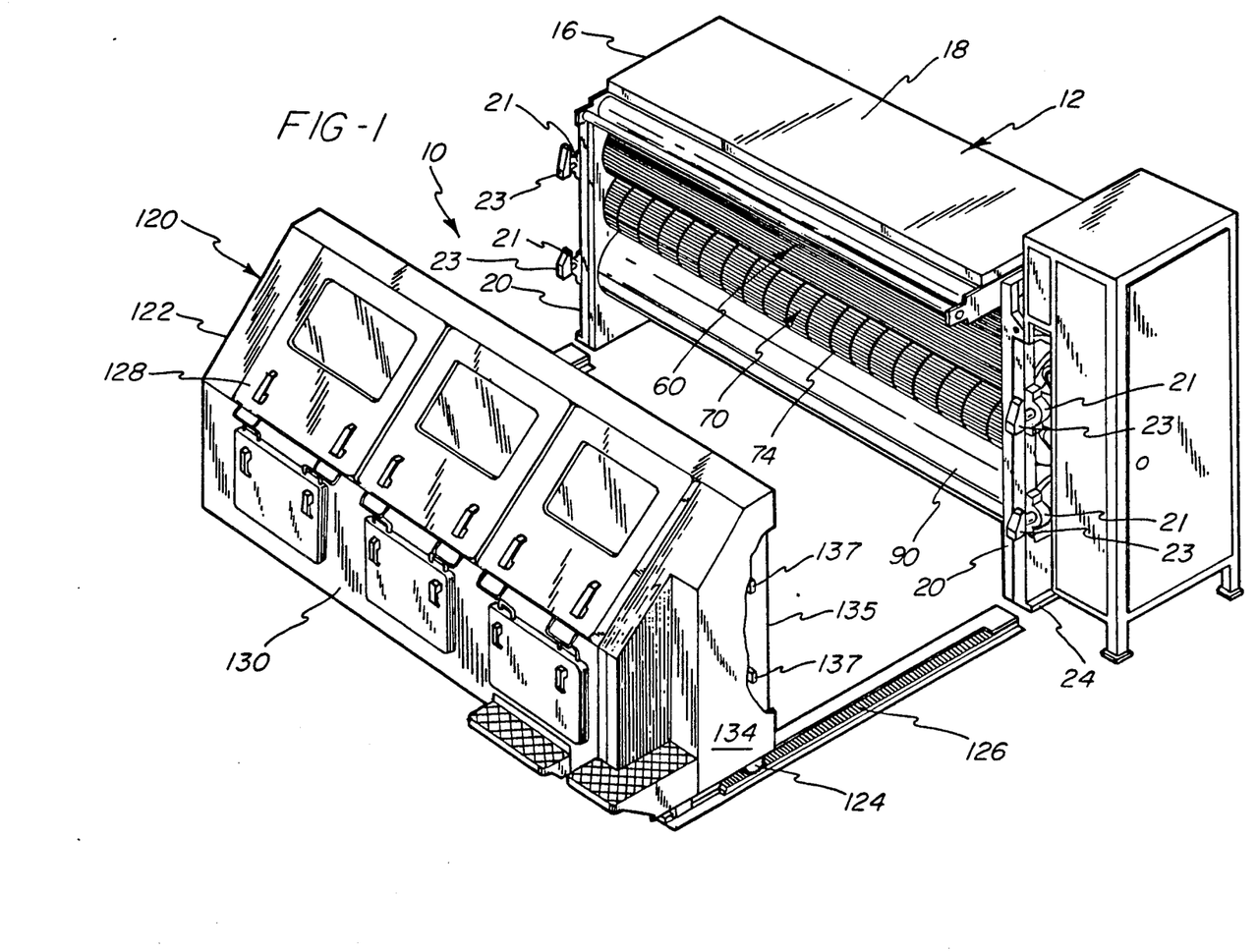
FIG. 1 is an isometric view of a single facer apparatus.

By way of reference to FIGS. 1-5, a first example of the inventive idler roll will be described in relation to a single facer corrugating apparatus. With reference first to FIG. 1, an apparatus is shown for making single faced corrugated board, that is, board including an inner corrugated medium having a sheet of liner paper adhesively fixed to the flutes of the corrugated medium on one side only, leaving the opposite corrugated side exposed. The single facer apparatus will be described herein generally, although the design is described in much greater detail in Applicants'patent application Ser. No. 528,306 filed concurrently herewith, and is incorporated herein by reference.

The single facer corrugating apparatus is shown generally at 10, comprising a corrugation portion 12, and a movable glue unit 120. The corrugating portion 12 generally comprises a structural frame 16, including an upper wall 18, side frames 20, and mounting feet or brackets 24. Two heated corrugating rolls are also included, an upper corrugating roll 60 and a lower, and driven corrugating roll 70, the two rolls 60 and 70 having complementary sinuously shaped meshing teeth 62, 72. The apparatus also includes a driven pressure roll 90 that is in tangential abutment with the lower corrugating roll 70. The corrugating portion 12 further comprises two preheating driven rolls 100 and 102, as shown in FIG. 2.

Figure 2:
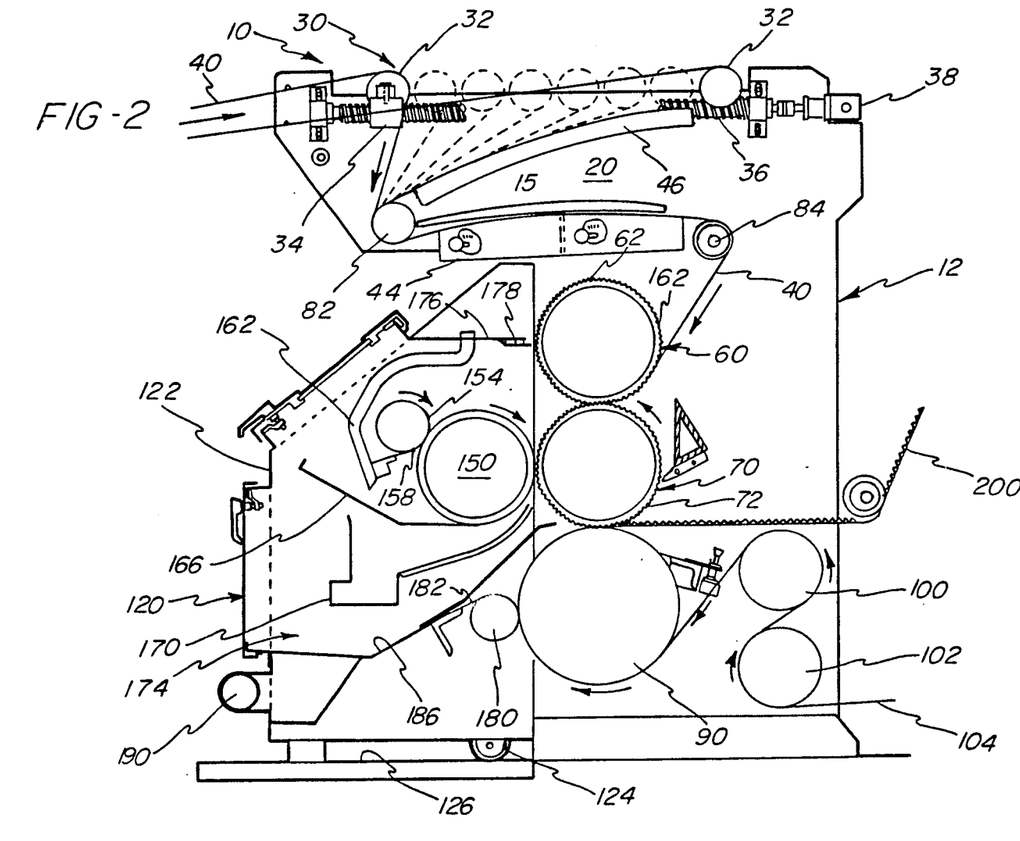
FIG. 2 is a side diagrammatical view of the single facer apparatus of FIG. 1.

With reference still to FIG. 2, the roll away glue unit 120 comprises a structural housing 122 having driven rollers 124 that are complementary with the linear track 126 (FIG. 1), enabling the rollers 124 to drive the glue unit, towards and away from, the corrugating unit 12. The roll away glue unit 120 also includes a glue supply system including a glue roll 150 in engagement with the lower corrugating roll 70, a metering roll 154, a glue supply manifold 162, a glue pan 166, a scraper blade 158 and a glue return manifold 170.

The roll away glue unit 120 includes a pressurized chamber 174 around the lower corrugating roll 70, as shown in FIG. 2. The chamber 174 is pressurized to approximately 1 psig, supplied by the air inlet piping 190. The pressurized chamber 174 is formed in part by the upper plate 176 having a sealing tip 178 extending therefrom, and projecting towards the upper corrugating roll 60. A sealing roll 180 is in engagement with the pressure roll 90, and is in further cooperation with a sealing plate 186 having at its end, a sealing tip that is in slidable engagement with the surface of the sealing roll 180.

As shown in FIG. 1, the movable glue unit further includes an internal frame structure such as 135 which, when the glue unit is fully forward, abuts the side frames 20 of the corrugating unit 12. Air cylinders 21 are also included on the corrugating unit 12 having locking members 23 at the ends. The pistons of the air cylinders 21 are rotatable, to position the locking member 23 behind the locking blocks 137 on the glue unit. The air cylinders 21 are thereafter retracted to draw the frame 135 into forced engagement with the side frames 20 of the corrugating unit, providing adequate sealing of the chamber 174 (FIG. 2) given the low pressure within the chamber. Thus, the interior of the chamber is sealed between the front plates 128, 130 (FIG. 1), the plates 176, 186, the sealing roll 180 and the sidewalls 134.

With reference still to FIG. 2, the paper 40 to be corrugated, typically referred to as the medium, is fed over the roll 32, and over the rolls 82 and 84. With the medium 40 heated and conditioned by the heater 46 and steam chamber 44, the fibers of the medium are somewhat loosened and softened and are fed into the nip point between the upper and lower corrugating rolls 60 and 70. The combination of the heat from the heated corrugating rolls and the pinching force from the meshing corrugating rolls, 70 reshapes the medium 40 into corrugated flutes having the same configuration as the teeth 62, 72 of the corrugating rolls 60, 70. The corrugated medium 40 continues around the lower corrugating roll 70 where adhesive is applied to the flute tips of the corrugated medium by the rotating glue roll 150.

The paper 104, typically referred to as the liner, is preheated by the heated rolls 100 and 102 and is fed around the pressure roll 90 and into the nip point created by the lower corrugating roll 70 and the pressure roll 90. The corrugated medium 40 and the liner paper 104 are merged at this nip point and, due to the heated corrugating roll 70 and heated pressure roll 90, the adhesive is gelatinized to form the single-faced corrugated paper 200.

Figure 3:
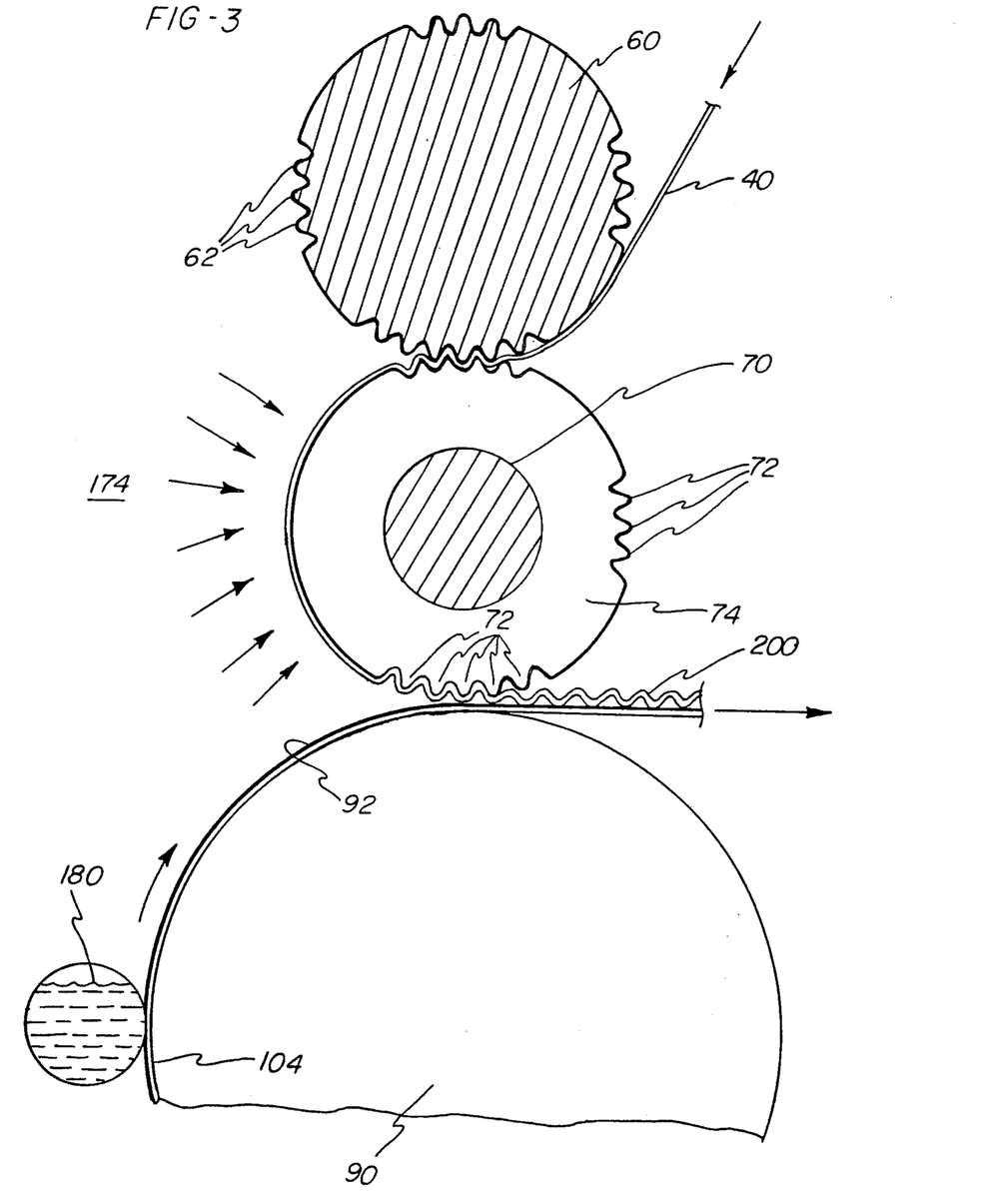
FIG. 3 is an enlarged cross-sectional view through the corrugating rolls at one of the slits in the lower corrugating roll.

With reference now to FIGS. 2 and 3, the corrugating process between the corrugating rolls will be described in greater detail. As shown in FIG. 3, the conditioned medium 40 is fed into the nip point between the two corrugating rolls 60, 70 and is pinched between the meshing teeth 62, 72, such that the conditioned medium conforms to the sinuous void between the two meshing teeth 62, 72. In order to complete the single faced board 200, the liner paper 104 is fed around the pressure roll 90 and against the corrugated medium.

As shown in FIG. 3, the corrugated medium is pressed against the liner paper 104, between the teeth 72 of the lower corrugating roll 70, and between the tangetial surface 92 of the heated pressure roll 90. The combination of the pressure from the two pinching rolls 70 and 90, and the heat from the heated pressure roll 90, gelatinizes the adhesive between the medium 40 and the liner paper 104.

In order to effect this gelatinization process, the formed corrugated flutes of the medium must remain in the corresponding teeth of the lower corrugating roll, during the travel between the nip point of the upper and lower corrugating rolls 60, 70, and the nip point of the lower corrugating roll and the heated pressure roll 90. If the flutes are not retained within the corresponding teeth 62, they can be crushed at the nip point of the lower corrugating roll 70 and the heated pressure roll 90.

It is common then to pressurize the front chamber such as 174 with low pressure air as mentioned above, such that the outside surface of the corrugated medium 40 is pressed against the lower corrugating roll 70, retaining the individual flutes of the medium in the corresponding sinuously shaped teeth 72. It is also common to include peripheral slits 74 (FIGS. 1 and 3) at various longitudinal positions along the lower corrugating roll 70 to provide atmospheric pressure on the backside of the corrugated medium, thereby creating a pressure differential across the corrugated medium, forcing the medium against the lower corrugating roll 70.

As mentioned above, the pressurized chamber 174 is a sealed chamber between the front plates 128, 130 (FIG. 1), the plates 176, 186, and the sidewalls 134. To seal the longitudinal dimension of the chamber between the heated pressure roll 90 and the lower plate 186, in one example of the invention, a sealing idler roll 180 is in tangential abutment against the heated pressure roll 90, and the chamber is air pressurized by the air inlet piping shown generally at 190 in FIG. 2. It is the sealing idler roll 180, that is subject to the thermal deformation as described above.

During the time when the single facer apparatus is not operating, the sealing roll 180 remains in tangential abutment with the heated pressure roll 90 and is heated along one tangential edge only. Thus, as mentioned above, in the past, the sealing rolls thermally expanded along the one heated edge, to take on a bowed configuration. To alleviate the aforementioned problems with the thermally distorted idler roll, Applicants have designed a novel idler roll which, with reference to FIG. 4, will be described in greater detail.

The sealing roll 180 generally comprises a hollow cylindrical tube 181 having stub shafts 183, 185, fixed to ends of the hollow tube. Cylindrical tube 181 includes an outer peripheral sealing surface 181a for mating engagement against the heated pressure roll. In the preferred embodiment of the invention, the sealing roll 180 is a cylindrical carbon steel tube approximately 6 inches in diameter, and overplated with chrome.

The cylindrical tube 181 is counterbored, at each end, as at 181b, to receive stub shaft assemblies 183 and 185 therein. The stub shafts 183 and 185 include mounting flanges 183a and 185a, respectively, and shaft portions 183b, and 185b. In the preferred embodiment of the invention, the stub shafts 183 and 185 are inserted within the counterbores 181b and welded in place, preferably at the exterior intersecting seam between the flanges 183a, 185a and the counterbores 181b.

The combination of the hollow tube 181 and the welded stub shafts 183 and 185 forms an internal sealed chamber, as at 181c. To access the chamber 181c, two threaded ports 183c are included through the flange 183, and are sealed by the insertion of pipe plugs 183d. In the preferred embodiment, the chamber 181c is filled with a liquid mixture, and in the preferred embodiment, the liquid is a solution comprising 1 part water with 4 parts ethylene glycol based antifreeze.

The above-described sealing roll 180 has solved the distortion problem associated with an idler roll in direct contact with the heated pressure roll 90 for extended lengths of time. When the sealing roll 180 is stationary and against the heated pressure roll 90, only one tangential edge of the sealing roll 180 is heated. By providing the sealing roll 180 as a hollow tube, the thermal resistance of the sealing roll 180 has been drastically reduced, and the heat can conduct rapidly in both directions away from the heated edge, through the thin wall of the tube 181.

Figures 5, 6:
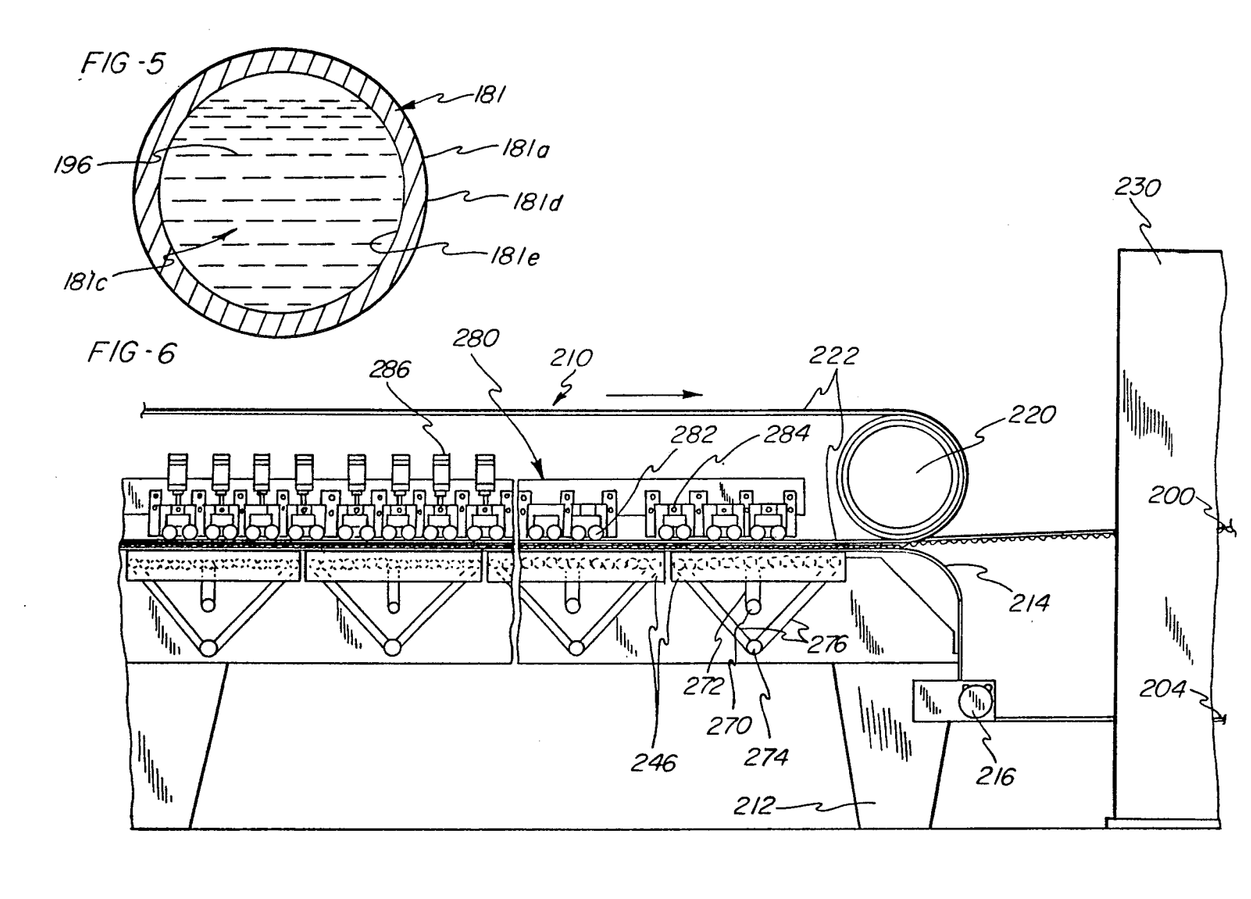
FIG. 5 is a diagrammatical view showing the fluid-filled seal roll in cross-section.
FIG. 6 is a diagrammatical view of a double facer apparatus having hollow fluid filled weight rolls.

Also, due to the thin wall of the tube 181, when the sealing roll 180 is stationary, the antifreeze solution 196 is proximate to the heated edge 181d, as at 181e, as depicted in FIG. 5. As the antifreeze solution 196 has better thermal conductivity than the carbon steel, the proximity of the antifreeze solution to the heated edge causes the heat from edge 181d to conduct radially inwardly and heat the antifreeze solution 196. If the seal roll 180 is slightly distorted when the apparatus is again started, the movement of the antifreeze solution 196 within the chamber 181c causes a forced convection heat transfer, uniformly transferring the heat throughout the tube walls.

Experimentation shows that the seal roll 180 does remain slightly distorted upon start-up of the apparatus. However, the time required for the seal roll 180 to reach an equilibrium temperature has been significantly reduced, from one-half hour on previous solid steel sealing rolls to 30 seconds with the fluid-filled seal roll 180 of the present invention.

Figure 7:
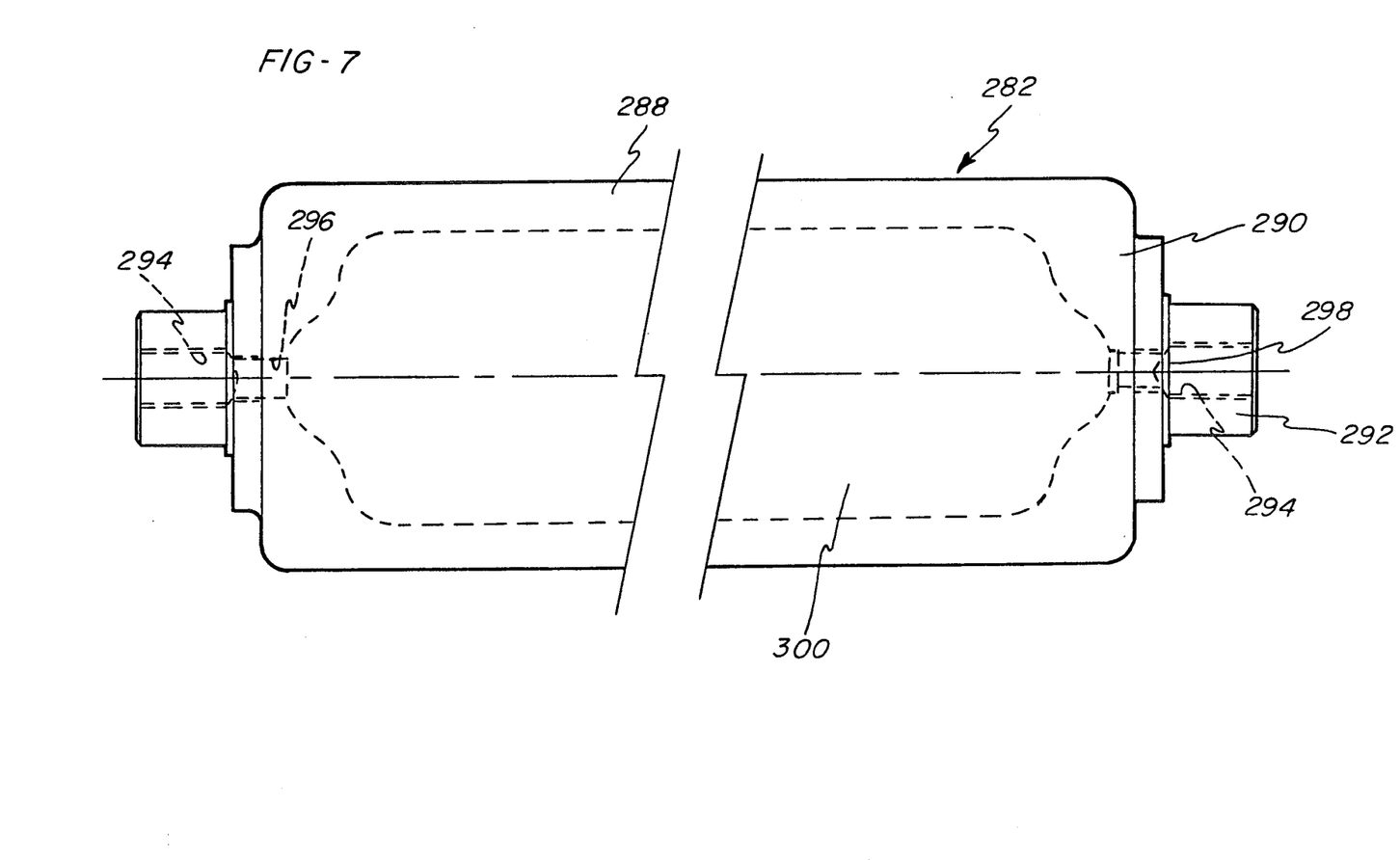
FIG. 7 is a side view of a hollow fluid roll for use as a weight roll in a double facer apparatus.

By reference now to FIGS. 6 and 7, another example of the inventive idler roll is shown, for use in a double facer apparatus. The double facer apparatus will be described herein generally, although the design is described in much greater detail in Applicants' patent application Ser. No. 528,294 filed concurrently herewith, and is incorporated herein by reference.

A double facer apparatus is shown at 210 in FIG. 6, and generally includes a structural frame 212, a plurality of heaters 246 arranged in a side-by-side array, a continuous belt 222 which is positioned adjacent to the top of the single faced corrugated paper 200, and a weight roll mechanism 280 for applying pressure against the continuous belt 222. A mechanism 230 is shown diagrammatically as receiving both single faced corrugated paper 200 and the second liner paper 204. This mechanism 230 should be understood to include a conventional preheating unit, a steaming unit and a glue unit.

As shown in FIG. 6, the weight roll mechanism is shown generally at 280 and applies pressure to the single face corrugated board 200 and second liner paper 204 to form the double faced board. The continuous belt 222 is wrapped around an idler roll 220 at one end, and around a driver roll (not shown) at the other end. The weight roll mechanism 280 includes individual weight rolls 282 that rest against the back side of the continuous belt 222 to force the single faced board and second liner against the heaters to gelatinize the adhesive therebetween. Lifting members 286 are included on some of the downstream weight rolls, to lift the rolls 282 off of the belt, to control the amount of heat imparted to the passing board.

With reference still to FIG. 6, both the single faced corrugated board 200 from the single facer apparatus of FIGS. 1 and 2, and the second liner paper 204 are fed through the conditioning mechanism 230 and are merged between the continuous belt 222 and an upper surface 214 of the frame 212. As the continuous belt 222 is pressed against the top of the single faced corrugated board 200, the belt 222 drives both the single faced corrugated board 200 and the second liner paper 204 over the plurality of heaters 246 from right to left as viewed in FIG. 6.

As the single faced corrugated board 200 and second liner paper 204 are moved over the heaters 246, the combination of the heat from the heaters 246, and the pressure from the weighted belt 222, gelatinizes the adhesive between the single faced board 200 and second liner paper 204 to form bonded double faced corrugated board. The weight of the paper being used to form the double faced corrugated board, and the speed at which the apparatus is operating, determines the amount of heat required to gelatinize the adhesive between the single faced board 200 and the second liner paper 204.

If the paper used to make the double faced corrugated board is quite thin, and if the speed of operation is slow, then the adhesive is gelatinized prior to reaching the last heater 246. In such a case, the lifters 286 would be activated to remove the weight of some of the downstream weight rolls from the belt 222. On the other hand, if the paper forming the corrugated board is rather heavy, and the speed of operation is quite rapid, then in all likelihood, the weight rolls will not be lifted, as the heat load to gelatinize the adhesive will be greater.

It is the weight rolls 282, in the double facer apparatus, which are subject to thermal distortion when the machine is stopped for an extended period of time, as they are in constant abutment with the hot continuous belt 222. As mentioned above, previous weight rolls tended to distort thermally, causing the weight rolls to bow along their length. This bowing caused disproportionate pressure against the continuous belt 222, thereby crushing the paper in some instances, while in others, applying little or no pressure.

With reference now to FIG. 7, the inventive weight roll 282 is shown in greater detail. The weight roll is preferably a one-piece item comprising a hollow central portion 288 and end portions 290 having integral stub shafts 292. The weight roll is formed by heating the ends of a tube, and thereafter swaging the ends to the desired diameter to form the stub shafts. Apertures 294, 296 are included in both stub shafts 292 to access the inner chamber 300. The inner apertures 296 are plugged with pipe plugs 298 to seal the inner chamber 300, while apertures 296 are threaded for mounting of the weight roll 282.

As constructed in FIG. 7, the weight roll 282 prevents the thermal distortion in the same manner as the seal roll described above with reference to FIGS. 1-5. Once again, when the double facer apparatus is idle, only one edge of the weight roll 282 contacts the heated belt 222; but due to the thin wall of the tube 288, the heat can conduct around the thin wall, allowing a more even temperature distribution. Also, the liquid within the chamber 300, being proximate to the inner surface of the chamber 300, allows heat to transfer from the heated edge to the liquid. The heated liquid can thereafter somewhat evenly distribute the heat within the weight roll 282, even while the rolls 282 are idle.

Also, after resuming operation of the double facer apparatus 210, the antifreeze solution within the weight roll 282 causes a forced convection heat transfer within the interior of the weight roll, cooling the heated edge and effecting an even temperature distribution within each of the individual weight rolls 282. Once the weight rolls 282 are uniformly heated, the rolls resume their original configuration.

While the forms of apparatus herein described, constitute preferred embodiments of the invention, it is to be understood that the invention is not limited to this precise form of apparatus, and that changes may be made without departing from the scope of the invention. which is defined in the appended claims.

What is claimed is:

1. An apparatus for the manufacture of single faced corrugated board, the apparatus comprising:
   a first feed means for feeding medium;
   first and second meshing corrugating rolls for accepting therebetween, the medium, to form sinuous flutes on the medium perpendicular to a travel direction of the medium;
   a heated driven roll in tangential abutment with said second corrugating roll;
   means to apply adhesive to said medium; and
   a second feed means for delivering a liner paper between said second fluted roll and said heated driven roll, pinching said liner paper and medium together to form a bonded single faced corrugated sheet;
   an enclosed pressurized chamber covering said second meshing corrugating roll, the pressure thereby retaining the formed flutes within the respective corrugations on said second corrugating roll; and
   a seal roll having an outer surface with a portion thereof in tangential rolling abutment with said heated driven roll thereby pressure sealing said chamber, said seal roll having a cylindrical cross-section and also having a hollow center forming an unobstructed internal void, said seal roll being at least partially liquid filled, said liquid moving without obstruction in said unobstructed internal void to facilitate convection heat transfer resulting from the fluid motion of said liquid in said unobstructed internal void in order to radially distribute heat away from said portion of said outer surface.

2. The apparatus of claim 1, wherein said seal roll includes sealing flanges at ends of said tube to enclose said tube.

3. The apparatus of claim 2, wherein said liquid is an ethylene glycol solution.

* * * * *